Nov. 19, 1946.  W. S. SAVILLE  2,411,392
CONTROL MECHANISM FOR HYDRAULICALLY OPERATED DEVICES
Filed June 26, 1943

Inventor
William S. Saville
By Fred Gerlach
his Atty.

Patented Nov. 19, 1946

2,411,392

UNITED STATES PATENT OFFICE 2,411,392

CONTROL MECHANISM FOR HYDRAULICALLY OPERATED DEVICES

William S. Saville, Fort Worth, Tex., assignor to Consolidated Vultee Aircraft Corporation, San Diego, Calif., a corporation of Delaware Application June 26, 1943, Serial No. 492,430

5 Claims. (Cl. 137—152)

The invention relates to a hydraulic system for the remote control of fluid under pressure for the operation of fluid-pressure operable devices.

Hydraulic systems are used on aircraft for operating tail skids, wheels, and other devices. These systems usually include selective control means located in the pilot's cab or house and fluid-pressure operated pistons in cylinders for operating devices which are located near the cylinders. This necessitates long delivery pipes between the control means and the cylinders. These pipes are, in military aircraft, exposed to gun-fire by an enemy or may be broken from other causes. Such a break may drain the hydraulic fluid from the control means through a broken delivery line in sufficient volume to reduce the fluid-supply for the proper operation of the remainder of the devices which are supplied from, or selectively controlled from the same source of fluid under pressure.

One object of the invention is to provide a hydraulic system for remotely controlled fluid-pressure operable devices which includes means for automatically stopping the flow of fluid from the pressure-source or control-means to the delivery line between the control-means and the hydraulically operated device, so that in the event of damage to or breakage in the delivery line, the supply of fluid to the pipe-line will be automatically cut off, and the supply of fluid under pressure for operating the other devices will remain intact and will not be impaired or incapacitated.

Another object of the invention is to provide automatic means for this purpose which is simple in construction and efficient in operation.

Other objects will appear from the detailed description.

The invention consists in the several novel features which are hereinafter set forth and are more particularly defined by claims at the conclusion hereof.

Figure 1:
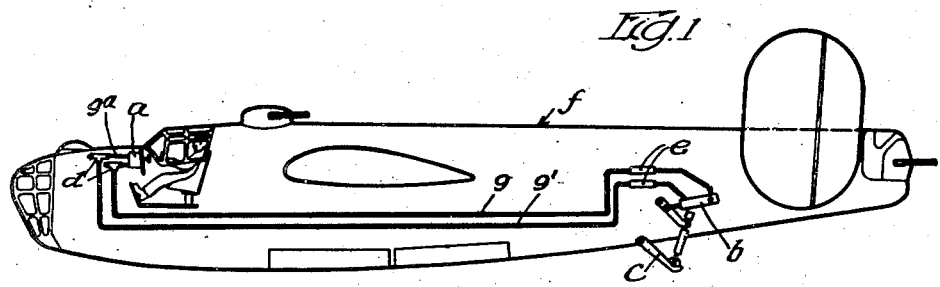
Fig. 1 is a diagrammatic view of a hydraulic system embodying the invention, exemplifying its use on an airplane for operating a tail-skid.
Figure 2:
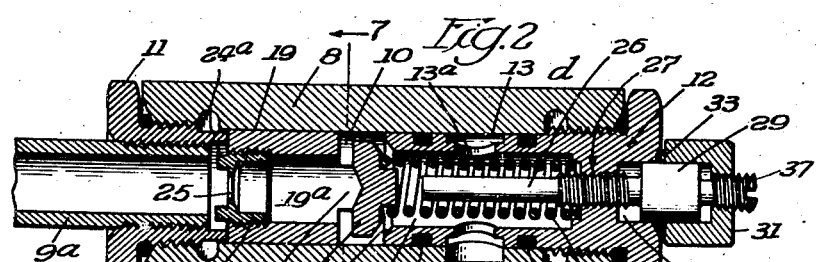
Fig. 2 is a longitudinal section of the automatic valve mechanism, the parts being shown in the position in which fluid will flow to the delivery line for the operation of the hydraulically operated device.
Figure 3:
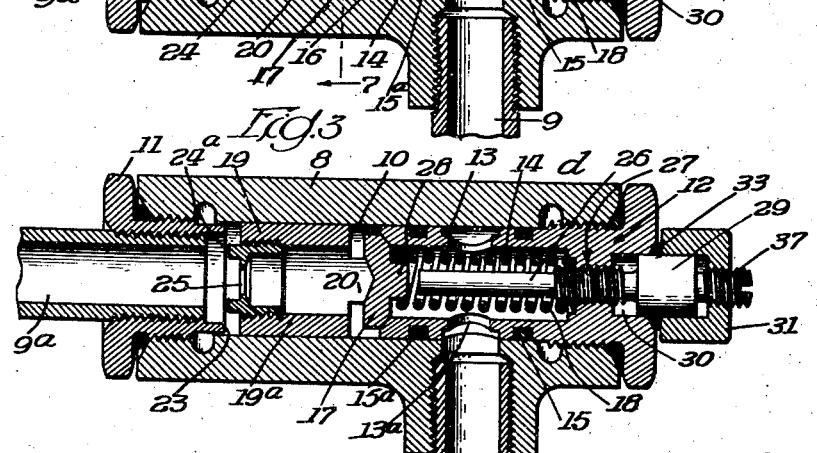
Fig. 3 is a similar view of the automatic valve mechanism, with the parts in the position assumed when the fluid has been cut off from the delivery line.
Figures 4, 5:
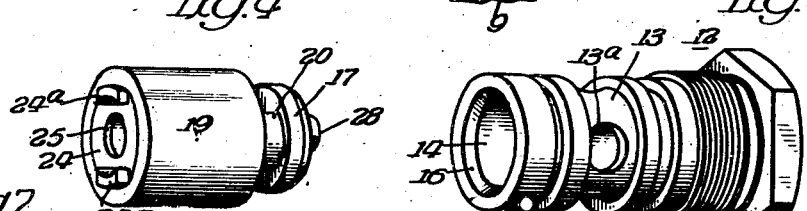
Fig. 4 is a perspective of the piston and the closure member of the automatic valve mechanism.
Fig. 5 is a perspective of the head in the valve-casing on which the seat for the closure-member is formed.
Figure 7:
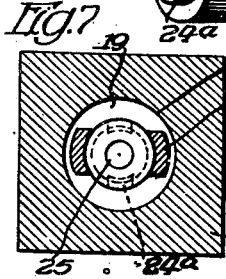
Fig. 7 is a section taken on line 7—7 of Fig. 2.
Figure 6:
Fig. 6 is a section illustrating the flow restricting device which is located adjacent the hydraulically operated device and produces a back-pressure in the delivery line.

The invention is exemplified in a hydraulic system on an airplane $f$ which is equipped with a pilot's control valve $a$ by which fluid under pressure may be selectively controlled from a supply of suitable fluid, such as a non-freezing solution or oil, under pressure and the return of the fluid to a reservoir, as well understood in the art, for shifting a tail-skid $c$ by a hydraulic jack $b$. This hydraulic jack is associated with and located in as close proximity as possible to the tail-skid $c$, and pipe lines 9 and 9' are provided to alternately conduct fluid to and from said jack for the two-way operation of the jack $b$. The pilot's control valve $a$ is usually adapted for the selective control of fluid under pressure for all or several two-way hydraulically operated devices from a common source of fluid pressure, and is located within convenient reach of the pilot. Pipes 9, 9' exemplify conduits for the delivery of high pressure fluid from the pilot's control valve to each hydraulic device which is to be operated, and for the return of the exhaust fluid to a reservoir from which it is drawn by a hydraulic pump and delivered to the control means. The control valve $a$ and the hydraulic jack $b$ may be of any suitable construction.

The automatic means for cutting off the flow of fluid to either of the delivery lines 9 or 9' comprises automatic valve mechanisms $d$ which are serially connected into the lines 9 and 9', respectively, in close proximity to the pilot's control valve $a$, and flow restricting devices $e$ which are likewise connected into the lines 9 and 9' in close proximity to the jack $b$. These mechanisms $d$ are alike in construction, are similarly connected to the control means $a$ and one of the jacks so that the detail description of one is applicable to both. Each mechanism $d$ is located as closely as practical to the control valve $a$. The mechanism $d$ comprises a casing 8 which is provided with a cylinder 10. A pipe-section 9ª which leads from the control valve $a$ is connected to one end of the cylinder 10 in casing 8 by a screw-threaded coupling ring 11 for delivery of fluid from the control valve a into the cylinder 10. A head 12 is screw-threaded into and closes the opposite end of casing 8 and is provided with a cylindrical chamber 14, a valve seat 16 at the inner end of chamber 14, an annular groove 13, and a series of radial ports 13ᵃ between chamber 14 and groove 13. The delivery pipe 9 is screw-threaded into casing 8 and communicates with the cylinder 10 around annular groove 13. Packing-rings 15 in the periphery of head 12 prevent leakage of fluid between the head and the casing. A closure or valve-member 17 in cylinder 10 is adapted to engage the seat 16 in the inner end of head 12. A piston 19 is slidably fitted in the cylinder 10, has a bore or cylindrical passage 19ᵃ, and is joined to member 17 by lugs 20 which space said piston from said member to permit fluid to flow around member 17 when it is separated from seat 16, between passage 19ᵃ and chamber 14. The inner end of coupling-ring 11 is extended to form an abutment 23 for limiting the outward movement of piston 19 and closure-member 17. A spring 18 is interposed between member 17 and the head 12 at the outer end of chamber 14 for pressing the closure-member 17 away from its seat 16 and shifting the piston 19 outwardly toward abutment 23. A nipple 24 is provided with lugs 24ᵃ whereby it may be turned in and out of the piston, for the use of nipples with ports 25 of different area according to the rate of flow of the fluid desired to the delivery pipe 9.

The flow restricting device e comprises a body e' which has one of its ends connected by a coupling e² to the section of the delivery pipe 9 from the automatic mechanism d and its other end connected by a coupling e³ to the section of the delivery pipe 9 which is connected to the hydraulic jack b. An orifice e⁴ extends through the casing e' and is adapted to restrict the velocity of flow of the fluid under pressure to the cylinder b¹ of the hydraulically operated device b.

The velocity of the fluid traveling through the system is directly proportional to the pressure head and is inversely proportional to the fluid friction in the lines, the amount of work done, and the viscosity of the fluid.

The principal function of the restrictor valves e is to introduce a source of fluid friction which comprises the major portion of the entire frictional resistance of the complete system. The restrictor valves are located at the maximum distance from the check valves d, hence, a break in the lines 9, 9' at any intermediate point has the effect of eliminating the greater part of the resistance in the lines, which results in an immediate acceleration of the fluid to a much higher velocity. The spring 18 in the mechanism d is adjusted to hold the valve 17 off its seat 16 against the pressure of the fluid at normal velocity, but to yield under the increased pressure of the fluid impinging against the valve 17 at the higher velocity resulting from a break in the lines, causing the valve to seat. Once the valve 17 has seated, the static pressure head of the fluid will hold it tightly against its seat.

Another function of the restrictor valves e is to regulate the velocity in relation to the viscosity of the fluid. Thus, when the fluid is relatively viscous at low temperature and exerts a greater force on the valve 17 for a given velocity, the restrictors e act to reduce the velocity so that the pressure exerted on the valve 17 is maintained substantially constant regardless of the temperature.

Still another function of the restrictor valves e is to prevent a pressure drop in the lines 9, 9' sufficient to close the valve 17 when the tail skid c is unlatched from its retracted position and is allowed to drop by gravity. If there were no restrictor valves e, the pressure drop in the lines 9, 9' due to falling of the tail skid by gravity would simulate a break in the lines and cause the valve 17 to close.

When it is desired to bleed the pipe 9ᵃ from control valve a or to fill the delivery pipe 9 to the device b with fluid from valve a it is necessary to hold the closure member 17 open. For that purpose a stem 26 is screw-threaded, as at 27, to the head 12 so that the stem can be turned and moved longitudinally, so its inner end of stem 26 will engage an abutment 28 on the inner end of member 17 to hold said member away from its seat 16 and force the piston 19 against abutment 23. The stem 26 is provided with a plunger 29 which is slidably fitted in a socket 30 in the outer end of head 12. A ring 31 is threaded to a screw 37 on the outer end of stem 26 and is adapted to lock the stem in its normal or operative position. Ring 31 engages a packing 33 to provide a seal around plunger 29.

The operation of the system is as follows: When it is desired to extend the tail skid c, the pilot operates the control valve a so that high pressure fluid is directed through line 9' and its associated mechanisms d and e to the left hand side of the hydraulic jack b. The piston in the jack b is thereby moved to the opposite end of the cylinder, swinging the tail skid c down to the extended position shown in Fig. 1. Fluid which is expelled from the right hand end of the cylinder is returned through line 9 and its associated mechanisms d and e to the control valve a whence it is directed to the reservoir tank (not shown). When it is desired to retract the tail skid, the control valve a is operated to direct the high pressure fluid through line 9 to the right hand end of the jack cylinder b, and the return fluid travels back to the control valve a through line 9'. In the event of a break in either of the lines 9, 9', the increased velocity of the fluid from the control means to the broken line will react on the piston 19 and valve 17 against the force of the spring 18, and cut off flow to the broken line.

The invention exemplifies a simple and efficient device for automatically cutting off the delivery of fluid under pressure used for selectively controlling a hydraulically operated device, whereby any breakage or defect in the delivery line will not cause the fluid from the control valve to be dissipated. The invention also exemplifies a device for this purpose which is simple in construction and efficient in operation.

The invention is not to be understood as restricted to the details set forth, since these may be modified within the scope of the appended claims without departing from the spirit and scope of the invention.

Having thus described the invention, what I claim as new and desire to secure by Letters Patent is:

1. A valve for controlling the operation of a hydraulic motor remotely located from a source of fluid under pressure comprising, a casing provided with a longitudinally extending chamber constituting a cylinder, a pipe connected to one end of the casing and in communication with one end of the cylinder, a second pipe connected to one side of the casing and communicating with the cylinder, a removable head extending into the opposite end of the casing and the cylinder and fitting in the cylinder, and provided with a longitudinally extending recess and a valve seat at its inner end, a piston slidable in the cylinder and provided at its inner end with a closure for said seat, and a bore in communication with the cylinder, ports in the piston between the bore and the cylinder, a spring in the recess in the head for shifting the closure, and means in the head communicatively connecting the second pipe and the recess.

2. A valve for controlling the operation of a hydraulic motor remotely located from a source of fluid under pressure comprising, a casing provided with a longitudinally extending chamber constituting a cylinder, a pipe connected to one end of the casing and in communication with one end of the cylinder, a second pipe connected to one side of the casing and communicating with the cylinder, a removable head extending into the opposite end of the casing and the cylinder and fitting in the cylinder and provided with a longitudinally extending recess and a valve seat at its inner end, a piston slidable in the cylinder and provided at its inner end with a closure for said seat and a bore, a removable nipple in the outer end of the piston providing communication between the cylinder and the bore, and ports in the piston between the bore and the cylinder, a spring in the head for shifting the closure, and means in the head communicatively connecting the second pipe and the recess.

3. A valve for controlling the operation of a hydraulic motor remotely located from a source of fluid under pressure comprising, a casing provided with a longitudinally extending chamber constituting a cylinder, a pipe connected to one end of the casing and in communication with one end of the cylinder, a second pipe connected to one side of the casing and communicating with the cylinder, a removable head extending into the opposite end of the casing and the cylinder and fitting in the cylinder, and provided with a longitudinally extending recess and a valve seat at its inner end, a piston slidable in the cylinder and provided at its inner end with a closure for said seat, and a bore in communication with the cylinder, and radial ports in the piston at the outer side of the closure and between the bore and the cylinder, a spring in the recess in the head for shifting the closure, and means in the head communicatively connecting the second pipe and the recess.

4. A valve for controlling the operation of a hydraulic motor remotely located from a source of fluid under pressure comprising, a casing provided with a longitudinally extending chamber constituting a cylinder, a pipe connected to one end of the casing and in communication with one end of the cylinder, a second pipe connected to one side of the casing and communicating with the cylinder, a removable head extending into the opposite end of the casing and the cylinder and fitting in the cylinder, and provided with a longitudinally extending recess and a valve seat at its inner end, a piston slidable in the cylinder and provided at its inner end with a closure for said seat, and ports between the bore and the cylinder and communicatively connecting the second pipe and the recess, a spring in the recess in the head for shifting the closure, a stem screw-threaded to the head, for locking the valve in its open position, and a packing and gland around the outer end of the stem.

5. A valve for controlling the operation of a hydraulic motor remotely located from a source of fluid under pressure comprising, a casing provided with a longitudinally extending chamber constituting a cylinder, a pipe connected to one end of the casing and in communication with one end of the cylinder, a second pipe connected to one side of the casing and communicating with the cylinder, a removable head extending into the opposite end of the casing and the cylinder and fitting in the cylinder, and provided with a longitudinally extending recess and a valve seat at its inner end, a piston slidable in the cylinder and provided at its inner end with a closure for said seat, and a bore in communication with the cylinder, and ports in the piston between the bore and the cylinder, a spring in the recess in the head for shifting the closure, and an annular channel and ducts in the head for communicatively connecting the second pipe and the recess.

WILLIAM S. SAVILLE.